United States Patent Office 3,037,338
Patented June 5, 1962

3,037,338
METHOD FOR MOLECULAR SIEVE
ADSORPTION AND DESORPTION
Tudor L. Thomas, Snyder, N.Y., assignor to Union Carbide Corporation, a corporation of New York
No Drawing. Filed Dec. 30, 1958, Ser. No. 783,719
14 Claims. (Cl. 55—58)

This invention relates to molecular sieve separation processes. More particularly, this invention relates to the use of a desorbent fluid in molecular sieve desorption.

The use of molecular sieve type zeolites for separating hydrocarbon mixtures is known. Molecular sieves are particularly useful in the separation of normal paraffins from gasoline to improve its octane characteristics. Such normal paraffins can be effectively removed by contacting the gasoline with a bed of molecular sieve and adsorbing the straight chain hydrocarbons thereon.

When the molecular sieve becomes so loaded with straight chain hydrocarbons that they are no longer adsorbed, the molecular sieve may be desorbed so as to be available for further adsorption. Desorption can be accomplished by heating the molecular sieve or by lowering the partial pressure of the adsorbed component in the gaseous phase adjacent to the molecular sieves or by a combination of these two methods.

Where desorption is accomplished by heating the molecular sieve to a temperature greater than that of adsorption this is referred to as a thermal cycle. The major advantage of a thermal cycle is that high differential loadings of adsorbate may be obtained on an adsorbent. Heating and cooling equipment must be employed, however and therefore the thermal swing cycle increases the cost of the operation. Also, crushing and attrition of the adsorbent pellets due to thermal expansion and contraction frequently occurs. It will be seen, as the present invention is discussed, that heat may also be required to desorb the displacing fluid utilized herein. The advantage of the invention over the ordinary thermal swing desorption cycle is that the entire process may usually be conducted at lower temperatures. Furthermore, it is frequently possible to choose a displacing fluid which need not be heated for desorption to the temperature required to desorb the adsorbate it has displaced. Also, while the displacing fluid is usually such that effectively all of the adsorbate is replaced, it may be necessary to desorb all of the displacing fluid in order to reinstate the molecular sieve to its full capacity for the adsorbate being separated from the hydrocarbon mixture.

The great advantage of adsorbing under pressure and desorbing at a reduced partial pressure of the adsorbed component is that the separation process can be operated at a nearly constant temperature. In many instances, however, this type of desorption is useful only at elevated temperatures since the vacuum required for desorption at lower temperatures makes the process economically prohibitive.

It is an object of this invention to provide an improved method for the desorption of adsorbed compounds from selective adsorbents.

It is a further object of this invention to provide a method for using a displacing fluid for removal of adsorbate from selective adsorbents.

Another object of this invention is to provide a method for using a less strongly adsorbed fluid to desorb a molecular sieve by being adsorbed thereon to the exclusion of the adsorbate being separated from the feed stream mixture.

Still another object of this invention is to provide an improved method for desorbing adsorbate from selective adsorbents by the use of a displacing fluid which is less strongly adsorbed than the adsorbate itself.

A further object of this invention is to provide a method for the desorption of adsorbed compounds from selective adsorbents containing the same with a minimum amount of less strongly adsorbed displacing fluid.

According to the present invention, an improved method is provided for desorbing a selective adsorbent containing one or more adsorbable compounds therein to the substantial exclusion of nonadsorbable compounds which comprises contacting said adsorbent with a separate adsorbable or desorbent fluid. More particularly an improved method is provided for desorbing a selective adsorbent containing one or more adsorbable compounds therein to the substantial exclusion of non-adsorbable compounds which comprises contacting said adsorbent with a separate fluid which is less strongly adsorbed on said adsorbent than the most strongly adsorbed compounds being desorbed. Desorption which occurs in accordance with the invention is due in fact to displacement of the compounds being desorbed from the selective adsorbent by the less strongly adsorbed fluid and in part to the purging action of the fluid. In the practice of the invention it is preferred to employ a displacement fluid which is readily separable from the desorbate.

It has been found that molecular sieve adsorbents may be desorbed by contacting the sieve with an adsorable fluid which can displace all or part of the adsorbate on the molecular sieve. It has also been found that when the desorbent fluid used in the practice of this invention is suitable less strongly adsorbed on the selective adsorbent than the adsorbate being desorbed, a constant feed rate of the desorbent fluid into the adsorbent bed containing adsorbate material produces an exchange mass transfer zone which moves through the bed. Ahead of this zone, the adsorbent contains essentially no desorbent fluid; behind this zone, the adsorbent contains essentially no desorbate material but primarily desorbent fluid.

Molecular sieve desorption may be accomplished quite readily in many instances by contacting the molecular sieve with a particular fluid. This fluid can be a purge which is substantially non-adsorbed at the pressure and temperature at which the desorption is carried out or it may be a displacement fluid which is adsorbed on the molecular sieve in place of the adsorbate being desorbed. Where a desorbent fluid is used, it may be more strongly adsorbed than the adsorbed component on the molecular sieve or it may be less strongly adsorbed.

The adsorbents which are operable in this invention include those molecular sieve type adsorbents described in U.S. Patent Nos. 2,882,243 and 2,882,244 both having issued on April 14, 1959 in the name of Robert M. Milton, and application Serial Number 762,957, filed September 24, 1958; and such natural occurring zeolites, for example, chabazite, faujasite, erionite, mordenite, gmelinite and analcite, described in said application Serial Number 762,957.

The propensity with which some compounds are adsorbed on a molecular sieve to the exclusion of others adsorbed thereon may be measured by the relative volatility, or relative adsorptivity of the compound. For example, on a calcium form of molecular sieve zeolite Type A described in Patent No. 2,882,243 the strength with which the following compounds are adsorbed varies from those most strongly held at the top of the list to those least strongly held at the bottom of the list:

$H_2O$
$NH_3$
$CH_3OH$
$H_2S$, $SO_2$
$n\text{-}C_8H_{18}$
$n\text{-}C_7H_{16}$
$n\text{-}C_6H_{14}$
$n\text{-}C_5H_{12}$, $CO_2$
Propylene
$n\text{-}C_4H_{10}$
$C_2H_4$
$C_3H_8$
$C_2H_6$
$CH_4$
$CO$
$N_2$
$H_2$ The relative adsorptivity of any compound in this list is greater than those listed below it and lesser than those listed above, and in general, will usually displace any compound below it and be displaced by any compound above it. It must be emphasized that this is but a partial list of compounds adsorbable on a molecular sieve.

It may be said, in general, that a suitable less strongly adsorbed desorbent fluid may be defined as one which, when present in the vapor phase adjacent to the molecular sieve in equal mol fractions with the least strongly held major component of the adsorbate, more adsorbate will be adsorbed on the molecular sieve than desorbent fluid. It is, however, still possible to make advantageous use of this type of desorbent fluid under proper conditions.

The proper selection of a desorbent fluid for use in this invention for a given adsorbate on a molecular sieve is best defined in terms of relative adsorptivity. The relative adsorptivity is determined under equilibrium conditions over the selective molecular sieve zeolite with an equal molar mixture of the desorbent fluid and the most strongly adsorbed component of the adsorbate fluid to be contacted therewith. Relative adsorptivity is, then, defined as follows:

$$\alpha = \frac{D_v}{A_v} \times \frac{A_a}{D_a}$$

wherein:

$D$ = mol fraction of desorbent fluid
$A$ = mol fraction of the most strongly held major component in adsorbate
$v$ = vapor phase
$a$ = adsorbed phase The relative adsorptivity, $\alpha$, is preferably about 1 to about 6 for best results for desorbing molecular sieve zeolites according to the present invention.

This invention relates to the desorption of selective adsorbents by use of desorbent fluids which, at the temperature and pressure of operation, are less strongly adsorbed on the absorbent than the adsorbate adsorbed during the adsorption separation cycle. Generally the less strongly adsorbed the desorbent fluid, the less complete the desorption of the previously adsorbed component will be and the more the amount of desorbent agent required. It follows, however, that the less strongly adsorbed the desorbent fluid, the lesser will be the difficulty in freeing the molecular sieve from the desorbent fluid for further adsorption separation. This advantage is valuable in olefin recovery processes and high molecular weight normal paraffin separations because extremely high vacuums are required to desorb olefins and high molecular weight normal paraffins at moderate temperature and cracking and polymerization of these compounds take place at elevated temperatures.

It has been found that carbon dioxide is a particularly good desorbent fluid where it is desired to desorb a molecular sieve being used in gasoline octane improvement. It is also valuable in the recovery of adsorbed ethylene and propylene.

In accordance with one practice of the invention in an adsorptive separation process wherein a hydrocarbon vapor stream is contacted with a zeolitic molecular sieve adsorbent which selectively adsorbs normal paraffins to the substantial exclusion of iso- and cyclic hydrocarbons, improved desorption of normal paraffins from said adsorbent is achieved by contacting said adsorbent with a fluid such as carbon dioxide which is less strongly adsorbed than $C_5$ and higher n-paraffins in the molecular sieves thereby releasing such n-paraffins for recovery. As more carbon dioxide is added, an exchange front is formed which moves in the direction of flow, said exchange front being a mass transfer front in which desorption of n-paraffins and adsorption of carbon dioxide occur. When all of or a sufficient amount of the n-paraffins have been desorbed by carbon dioxide, adsorbed carbon dioxide may be subsequently desorbed from the adsorbent, and the molecular sieve adsorbent may then be used for further adsorption.

The carbon dioxide is preferably passed through the molecular sieve bed counter-currently with respect to the direction in which the mixture to be separated had been passed. This maximizes desorption and minimizes contamination of the non-adsorbed component of the mixture by the adsorbed constituent when adsorption is again begun. The carbon dioxide-laden bed can be desorbed by heating with hot carbon dioxide and a vacuum can be employed to desorb additional carbon dioxide. The bed can be cooled by recirculating through it fresh feed or the non-adsorbed product until the initial adsorption temperature is reached, at which time the adsorption cycle can be begun.

In addition to carbon dioxide, other desorbent agents which are less strongly adsorbed on molecular sieves than the adsorbate may be used. The desorption may be conducted in the vapor phase or in the liquid phase. The desorbent fluid may be passed through the molecular sieve bed either counter-currently or co-currently with respect to the direction in which the mixture to be separated had been passed. As already mentioned, a counter-current desorption minimizes contamination of the non-adsorbed components of the mixture by the adsorbable constituents when adsorption is resumed, and maximizes desorption because the more strongly adsorbed constituents which are desorbed first by the desorbent fluid, in passing over other adsorbed constituents, aid in stripping a portion of the strongly adsorbed components. A co-current desorption is useful when a portion of the least strongly adsorbed component is desired in a relatively pure state. Here, the chromatographic effect of the adsorbent column is utilized to provide the partial separation. This technique, however, will not provide pure component cuts of materials other than the least strongly adsorbed of the adsorbable constituents.

Following the desorption step, the desorbent agent should be removed from the selective adsorbent. It is desirable that a substantial portion of the desorbent agent be desorbed from the adsorbent before the adsorbent is returned to the adsorption step. Any convenient means of desorption may be used, such as heating the bed, reducing the pressure, stripping with a purge gas, or any combination of these methods. If the adsorbate which was desorbed by the desorbent fluid were heat sensitive, it is no longer present in any substantial amounts on the adsorbent and the application of heat will no longer cause any significant loss of adsorbate or damage to the adsorptive properties of the adsorbent.

It will be apparent to those skilled in the art that in the light of the foregoing disclosures and the following examples, many changes, substitutions, and modifications are possible without departing from the spirit or scope of this invention. It can be used in a fixed or moving bed process.

Although the use of a less strongly adsorbed desorbent fluid usually requires a larger amount of fluid to be used than that required with a more strongly adsorbed fluid, there are certain advantages which accrue from its use. These advantages flow primarily from the relative ease with which the displacing fluid may be desorbed from the adsorbent.

For example, consider a selective adsorbent capable of adsorbing normal-hexane from a hydrocarbon mixture. When the adsorbent has been loaded with adsorbate to its full capacity, a desorption step in which a less strongly adsorbable material is contacted with the adsorbent is used to both displace the normal-hexane and purge or strip it from the adsorbent. The removed normal-hexane should of course, be separated from the desorbent agent since both will be recovered at the exit of the adsorbent bed. This may usually be accomplished in a fractionating column.

When all or most of the normal-hexane has been desorbed the adsorption cycle can be repeated. Since the normal-hexane is more strongly adsorbed than the desorbed fluid, the desorbent fluid need not be desorbed before the normal-hexane adsorption step as the normal-hexane will displace the desorbent fluid quite easily. In this particular instance, the desorbent fluid could be normal-pentane, normal-butane, propane or any fluid which is less strongly adsorbed on the adsorbent than the adsorbate normal-hexane. The adsorption-desorption cycle can be operated adiabatically or in combination with a thermal swing in which a temperature rise assists the desorption.

Where a desorbent fluid is used which is non-condensable under normal conditions, such as carbon dioxide, the adsorption-desorption cycle may be accomplished substantially as described above, except that hydrocarbon streams can be separated from the carbon dioxide desorbent gas by cooling followed by phase separation.

EXAMPLE I

Molecular sieve zeolite A in the calcium ion exchanged form termed Linde Type 5A molecular sieve, was used to adsorb normal-hexane and carbon dioxide was used as a desorbent fluid. Isobutane was added to the carbon dioxide desorption stream as a tracer. The pressure of adsorption and desorption was 1 atmosphere and the temperature of adsorption and desorption was 300° F.

Approximately 0.365 pound of 5 x 7 mesh Linde Type 5A molecular sieve pellets in a bed length of 1.5 feet was used. The normal-hexane was adsorbed to a value of 9.8 pounds per 100 lbs. of molecular sieve. The desorbent stream was comprised of about 1.353 standard cubic feet per hour of carbon dioxide and 0.184 standard cubic feet per hour of isobutane. The mass of desorbent used was 0.607 pound-mol per hour, per square foot of molecular sieve bed cross-sectional area. Of this amount, 0.536 mol was carbon dioxide and 0.071 mol was isobutane. The cross-sectional area of the bed was 0.0067 square foot. The results are indicated below in Table 1.

*Table 1*

| Effluent Concentration Mol. Ratio | | Effluent Concentration Mol. Fraction | | | Average Loading, Lb./100 Lb. M.S. | | Mols. Desorbent per 100 Lb. Molecular Sieve |
|---|---|---|---|---|---|---|---|
| $CO_2/iC_4$ [1] | $n\text{-}C_6/iC_4$ [2] | $CO_2$ | $i\text{-}C_4$ | $n\text{-}C_6$ | $n\text{-}C_6$ | $CO_2$ | |
| 0 | 0 | 0 | 0 | 100 | (9.80) | 0 | 0 |
| 0 | 26.04 | | | | 8.20 | | 0.0033 |
| 3.832 | 2.246 | 0.541 | 0.141 | 0.317 | 6.37 | 3.00 | 0.0496 |
| 5.771 | 1.110 | 0.732 | 0.127 | 0.141 | 5.63 | 3.49 | 0.0995 |
| 6.709 | 0.548 | 0.813 | 0.121 | 0.066 | 5.13 | 3.88 | 0.1650 |
| 7.085 | 0.347 | 0.840 | 0.119 | 0.041 | 4.78 | 4.08 | 0.2490 |
| 7.275 | 0.242 | 0.854 | 0.117 | 0.029 | 4.50 | 4.19 | 0.3480 |
| 7.302 | 0.208 | 0.858 | 0.118 | 0.025 | 4.34 | 4.20 | 0.4150 |
| 7.389 | 0.173 | | | | 4.21 | 4.20 | 0.4960 |
| 7.44 | 0.129 | 0.868 | 0.117 | 0.015 | 3.93 | 4.20 | 0.7460 |
| 7.61 | 0.101 | 0.874 | 0.115 | 0.012 | 3.64 | 4.20 | 0.9950 |

[1] $i\text{-}C_4$ means isobutane.
[2] $n\text{-}C_6$ means normal-hexane.

EXAMPLE II

The conditions and steps of Example I were repeated except that a bed length of 1.33 feet was used and a measured loading of 9.0 pounds per 100 pounds of molecular sieve Type 5A of normal-hexane were initially adsorbed. The results of this example are shown in Table 2 below.

*Table 2*

| Effluent Concentration Mol. Ratio | | Effluent Concentration Mol. Fraction | | | Average Loading, Lb./100 Lb. M.S. | | Mols. Desorbent per 100 Lb. Molecular Sieve |
|---|---|---|---|---|---|---|---|
| $CO_2/iC_4$ | $n\text{-}C_6/iC_4$ | $CO_2$ | $i\text{-}C_4$ | $n\text{-}C_6$ | $n\text{-}C_6$ | $CO_2$ | |
| 0 | | | | 1.00 | 0.00 | 0.00 | 0.00 |
| 3.662 | 3.030 | 0.476 | 0.130 | 0.394 | 6.41 | 1.50 | 0.0373 |
| 5.841 | 1.079 | 0.738 | 0.126 | 0.136 | 5.40 | 2.21 | 0.0930 |
| 6.706 | 0.414 | 0.826 | 0.123 | 0.051 | 4.75 | 2.66 | 0.185 |
| 6.909 | 0.268 | 0.844 | 0.123 | 0.033 | 4.46 | 2.90 | 0.281 |
| 6.976 | 0.170 | 0.856 | 0.123 | 0.021 | 4.04 | 3.18 | 0.468 |
| 7.515 | 0.129 | | | | 3.78 | 3.24 | 0.656 |
| | | | | | 3.52 | 3.26 | 0.941 |
| 6.494 | 0.090 | 0.856 | 0.132 | 0.012 | 3.33 | 3.26 | 1.13 |

EXAMPLE III

The steps and conditions of Example II were repeated except that 0.368 pounds of 5 x 7 mesh Linde Type 5A molecular sieve was used and the temperature of adsorption and desorption was 250° F. The measured loading of normal-hexane on the molecular sieve was 9.9 pounds per 100 pounds of molecular sieve.

The results of this example are shown below in Table 3.

*Table 3*

| Effluent Concentration Mol. Ratio | | Effluent Concentration Mol. Fraction | | | Average Loading, Lb./100 Lb. M.S. | | Mols. Desorbent per 100 Lb. Molecular Sieve |
|---|---|---|---|---|---|---|---|
| $CO_2/iC_4$ | $n\text{-}C_6/iC_4$ | $CO_2$ | $i\text{-}C_4$ | $n\text{-}C_6$ | $n\text{-}C_6$ | $CO_2$ | |
| 0 | | | | | 1.00 | 0.00 | 0 |
|  |  |  |  |  | 1.00 | 0.30 | 0.00926 |
| 1.275 | 2.907 | 0.245 | 0.193 | 0.561 | 7.50 | 1.26 | 0.0371 |
| 4.089 | 1.463 | 0.617 | 0.151 | 0.221 | 6.35 | 2.55 | 0.0027 |
| 5.579 | 0.616 | 0.775 | 0.139 | 0.086 | 5.53 | 3.61 | 0.185 |
| 6.257 | 0.330 | 0.825 | 0.132 | 0.044 | 5.10 | 4.14 | 0.279 |
| 6.776 | 0.192 | 0.834 | 0.139 | 0.029 | 4.57 | 4.70 | 0.464 |
|  |  |  |  |  | 4.25 | 4.98 | 0.650 |
| 7.189 | 0.118 | 0.865 | 0.120 | 0.014 | 4.05 | 5.15 | 1.03 |
| 7.184 | 0.087 | 0.865 | 0.121 | 0.011 | 3.95 | 5.20 | 1.112 |

EXAMPLE IV

The steps and conditions of Example III were repeated except that 0.378 pounds of 5 x 7 mesh Linde Type 5A molecular sieve was used and the temperature was 212° F. The measured loading of normal-hexane was 9.2 pounds per 100 pounds of molecular sieve. The results of this example are indicated below in Table 4.

*Table 4*

| Effluent Concentration Mol. Ratio | | Effluent Concentration Mol. Fraction | | | Average Loading, Lb./100 Lb. M.S. | | Mols. Desorbent per 100 Lb. Molecular Sieve |
|---|---|---|---|---|---|---|---|
| $CO_2/iC_4$ | $n\text{-}C_6/iC_4$ | $CO_2$ | $i\text{-}C_4$ | $n\text{-}C_6$ | $n\text{-}C_6$ | $CO_2$ | |
| 0 | | | | | 9.15 | 0.00 | 0 |
|  | 0.4092 | 0.00 | 0.709 | 0.291 | 7.95 | 1.45 | 0.0269 |
| 2.758 | 2.251 | 0.459 | 0.166 | 0.375 | 7.12 | 1.83 | 0.0322 |
| 4.279 | 1.426 | 0.638 | 0.149 | 0.213 | 6.38 | 2.30 | 0.0891 |
| 6.117 | 0.407 | 0.813 | 0.133 | 0.054 | 5.00 | 3.05 | 0.267 |
| 6.581 | 0.195 | 0.846 | 0.129 | 0.025 | 4.48 | 4.81 | 0.445 |
| 6.796 | 0.135 | 0.857 | 0.126 | 0.017 | 4.17 | 5.20 | 0.625 |
| 5.716 | 0.091 | 0.794 | 0.194 | 0.013 | 3.97 | 5.50 | 0.891 |
| 7.136 | 0.081 | 0.868 | 0.122 | 0.010 | 3.85 | 5.56 | 1.07 |

In the case of carbon dioxide as a desorbent fluid, the temperature of desorption should be carefully adjusted. At a relatively lower temperature, while the loading of carbon dioxide has a tendency to increase, there is also a tendency for the adsorbate to be more strongly adsorbed so that more desorbent fluid is needed per unit reduction in adsorbate loading. In other words the relative adsorptivity of carbon dioxide and adsorbate may change unfavorably.

On the other hand, if the temperature of desorption is too high, carbon dioxide and most other less strongly adsorbed displacement fluids will behave like inert purge gases and a portion of the displacement effect will be lost. Experiments have shown that carbon dioxide can be effectively used between 200° F. and 400° F., about 300° F. being preferred.

EXAMPLE V

A bed containing 0.380 pound of Linde Type 5A 5 x 7 mesh molecular sieve having a density of 42.5 pounds per cubic foot was used to adsorb normal-hexane supplied to it at 0.0555 gallon per hour for ½ hour at 300° F. The final loading was 8.8 pounds of normal-hexane per 100 pounds of molecular sieve. Desorption was accomplished by contacting the molecular sieve bed with a desorption stream comprised of 1.353 standard cubic feet per hour of carbon dioxide with 0.184 st. cu. ft. per hr. of isobutane. The standard cubic feet herein referred to were measured at a pressure of 70° F. Total desorption time was one hour and the estimate residue adsorbed on the molecular sieve was 3.3 pounds of normal hexane per 100 pounds of molecular sieve and 3.3 pounds carbon dioxide per 100 pounds of molecular sieve. The loading of carbon dioxide was zero at this time.

This example shows that the desorbent fluid, in this case carbon dioxide, can be effectively removed by the mere operation of the adsorption cycle.

I claim:

1. A process for the separation of straight chain hydrocarbons of at least five carbon atoms per molecule from non-straight chain hydrocarbons contained in a vaporized hydrocarbon mixture containing constituents having at least five carbon atoms per molecule which comprises contacting said vaporized hydrocarbon mixture with a zeolitic molecular sieve solid selective adsorbent which selectively adsorbs straight chain hydrocarbons to the substantial exclusion of non-straight chain hydrocarbons, periodically contacting said adsorbent with carbon dioxide displacement fluid which is thereby adsorbed less strongly on said adsorbent than the displaced straight chain hydrocarbons, the displacement fluid contact being effected without the introduction of external heat, and then desorbing said carbon dioxide fluid from said adsorbent.

2. A process for the desorption of a zeolitic molecular sieve solid selective adsorbent which selectively adsorbs straight chain hydrocarbons to the substantial exclusion of non-straight chain hydrocarbons and having straight chain hydrocarbons of at least five carbon atoms per molecule adsorbed thereon, which comprises contacting said adsorbent with carbon dioxide displacement fluid which is less strongly adsorbed on said adsorbent than said straight chain hydrocarbons, thereby adsorbing on said adsorbent said carbon dioxide fluid and desorbing substantially all of said straight chain hydrocarbons, the displacement fluid contact being effected without the introduction of external heat, and then desorbing said carbon dioxide fluid from said adsorbent.

3. A process according to claim 2, in which the carbon dioxide displacement fluid is desorbed from said adsorbent by heating said adsorbent.

4. A process according to claim 2, in which the carbon dioxide displacement fluid is desorbed from said adsorbent by reducing the pressure to below atmospheric pressure.

5. A process for the separation of straight chain hydrocarbons of at least five carbon atoms per molecule from non-straight chain hydrocarbons contained in a vaporized hydrocarbon mixture containing constituents having at least five carbon atoms per molecule which comprises contacting said vaporized hydrocarbon mixture with a zeolitic molecular sieve solid selective adsorbent which selectively adsorbs straight chain hydrocarbons to the substantial exclusion of non-straight chain hydrocarbons, thereafter contacting said adsorbent with carbon dioxide without the introduction of external heat, until said carbon dioxide is adsorbed on said adsorbent to the substantial exclusion of said straight chain hydrocarbons and then desorbing said carbon dioxide by heating said molecular sieve to a temperature of not more than about 700° F.

6. A process for the separation of straight chain hydrocarbons of at least five carbon atoms per molecule from non-straight chain hydrocarbons contained in a vaporized hydrocarbon mixture containing constituents having at least five carbon atoms per molecule with a zeolitic molecular sieve solid selective adsorbent which selectively adsorbs straight chain hydrocarbons, thereby adsorbing on said adsorbent at least a portion of said straight chain hydrocarbons, thereafter removing such hydrocarbons from the selective adsorbent by contacting said adsorbent with carbon dioxide without the introduction of external heat, thereby adsorbing said carbon dioxide on said adsorbent to the substantial exclusion of said straight chain hydrocarbons, then desorbing said adsorbent by heating to a temperature of not more than about 700° F.

7. A process for the separation of straight chain hydrocarbons of at least five carbon atoms per molecule from non-straight chain hydrocarbons contained in a vaporized hydrocarbon mixture containing constituents having at least five carbon atoms per molecule which comprises contacting said vaporized hydrocarbon mixture with a zeolitic molecular sieve solid selective adsorbent which selectively adsorbs straight chain hydrocarbons to the substantial exclusion of non-straight chain hydrocarbons, thereby adsorbing on said adsorbent at least a portion of said straight chain hydrocarbons, thereafter desorbing said straight chain hydrocarbons from the selective adsorbent by contacting said adsorbent with carbon dioxide without the introduction of external heat and at substantially the same pressure at which said straight chain hydrocarbons were adsorbed on said selective adsorbent, thereby adsorbing said carbon dioxide on said adsorbent to the substantial exclusion of said straight chain hydrocarbons, then desorbing said adsorbent by heating to a temperature of not more than about 700° F.

8. A process for the separation of straight chain hydrocarbons of at least five carbon atoms per molecule from non-straight chain hydrocarbons contained in a vaporized hydrocarbon mixture containing constituents having at least five carbon atoms per molecule which comprises contacting said vaporized hydrocarbon mixture with a zeolitic molecular sieve solid selective adsorbent which selectively adsorbs straight chain hydrocarbons to the substantial exclusion of non-straight chain hydrocarbons, thereby adsorbing on said adsorbent at least a portion of said straight chain hydrocarbons, thereafter desorbing said straight chain hydrocarbons from the selective adsorbent by contacting said adsorbent with carbon dioxide without the introduction of external heat and at substantially the same pressure at which said straight chain hydrocarbons were adsorbed on said selective adsorbent, thereby adsorbing said carbon dioxide on said adsorbent to the substantial exclusion of said straight chain hydrocarbons, then reducing the amount of said carbon dioxide adsorbed on the selective adsorbent to an amount at which the adsorptive capacity of the adsorbent for straight chain hydrocarbons is about the same as the capacity of the adsorbent without any adsorbate adsorbed thereon.

9. A process for the separation of normal hexane from non-straight chain hydrocarbons contained in a vaporized hydrocarbon mixture which comprises contacting said vaporized hydrocarbon mixture with a zeolitic molecular sieve solid selective adsorbent which selectively adsorbs normal hexane to the substantial exclusion of non-straight chain hydrocarbons, periodically contacting said adsorbent with carbon dioxide displacement fluid which is less strongly adsorbed on said adsorbent than normal hexane, the displacement fluid contact being effected without the introduction of external heat, and heating said solid selective adsorbent to desorb said carbon dioxide displacement fluid.

10. A process for the separation of normal hexane from non-straight chain hydrocarbons contained in a vaporized hydrocarbon mixture which comprises contacting said vaporized hydrocarbon mixture with a zeolitic molecular sieve solid selective adsorbent which selectively absorbs normal hexane to the substantial exclusion of non-straight chain hydrocarbons, thereafter contacting said adsorbent with carbon dioxide displacement fluid which is less strongly adsorbed on said adsorbent than normal hexane and without the introduction of external heat, said fluid being adsorbed on said adsorbent to the substantial exclusion of said straight normal hexane, and then desorbing said carbon dioxide fluid by heating said selective adsorbent to a temperature of not more than about 700° F.

11. A process for the separation of normal hexane from non-straight chain hydrocarbons contained in a vaporized hydrocarbon mixture which comprises contacting said vaporized hydrocarbon mixture with a zeolitic molecular sieve solid selective adsorbent which selectively adsorbs normal hexane to the substantial exclusion of non-straight chain hydrocarbons, thereby adsorbing on said adsorbent at least a portion of said normal hexane, thereafter desorbing said normal hexane from the selective adsorbent by contacting said adsorbent with carbon dioxide displacement fluid which is less strongly adsorbed on said adsorbent than normal hexane, the displacement fluid contact being effected without the introduction of external heat and at substantially the same pressure at which said normal hexane was adsorbed on said adsorbent, thereby adsorbing said carbon dioxide fluid on said adsorbent to the substantial exclusion of said normal hexane, then desorbing said adsorbent by heating to a temperature of not more than about 700° F.

12. A process for the separation of normal heptane from non-straight chain hydrocarbons contained in a vaporized hydrocarbon mixture which comprises contacting said vaporized hydrocarbon mixture with a zeolitic molecular sieve solid selective adsorbent which selectively adsorbs normal heptane to the substantial exclusion of non-straight chain hydrocarbons and periodically contacting said adsorbent with carbon dioxide displacement fluid which is less strongly adsorbed on said adsorbent than normal heptane, the displacement fluid contact being effected without the introduction of external heat, and heating said solid selective adsorbent to desorb said carbon dioxide fluid.

13. A process for the separation of normal heptane from non-straight chain hydrocarbons contained in a vaporized hydrocarbon mixture which comprises contacting said vaporized hydrocarbon mixture with a zeolitic molecular sieve solid selective adsorbent which selectively adsorbs normal heptane to the substantial exclusion of non-straight chain hydrocarbons, thereby adsorbing on said adsorbent at least a portion of said normal heptane, thereafter desorbing said normal heptane from the selective adsorbent by contacting said adsorbent with carbon dioxide displacement fluid which is less strongly adsorbed on said adsorbent than normal heptane without the introduction of external heat and at about the same pressure that the normal heptane was adsorbed on said adsorbent, thereby adsorbing said carbon dioxide fluid on said adsorbent to the substantial exclusion of said normal heptane, then reducing the amount of said carbon dioxide fluid adsorbed on the selective adsorbent to an amount at which the adsorptive capacity of the adsorbent for normal heptane is about the same as the capacity of the adsorbent with no adsorbate adsorbed thereon.

14. A process according to claim 1 in which said contacting with carbon dioxide displacement fluid is countercurrent to said contacting with the vaporized hydrocarbon mixture.

References Cited in the file of this patent

UNITED STATES PATENTS

| | | | |
|---|---|---|---|
| 2,519,874 | Berg | | Aug. 22, 1950 |
| 2,522,426 | Black | | Sept. 12, 1950 |
| 2,818,137 | Richmond et al. | | Dec. 31, 1957 |
| 2,818,455 | Ballard et al. | | Dec. 31, 1957 |
| 2,834,429 | Kinsella et al. | | May 13, 1958 |
| 2,866,835 | Kimberlin et al. | | Dec. 30, 1958 |
| 2,894,998 | Hess et al. | | July 14, 1959 |
| 2,938,864 | Fleck et al. | | May 31, 1960 |